No. 888,778. PATENTED MAY 26, 1908.
C. F. BARNDT & W. J. MILLER.
VEHICLE SEAT.
APPLICATION FILED APR. 24, 1907.
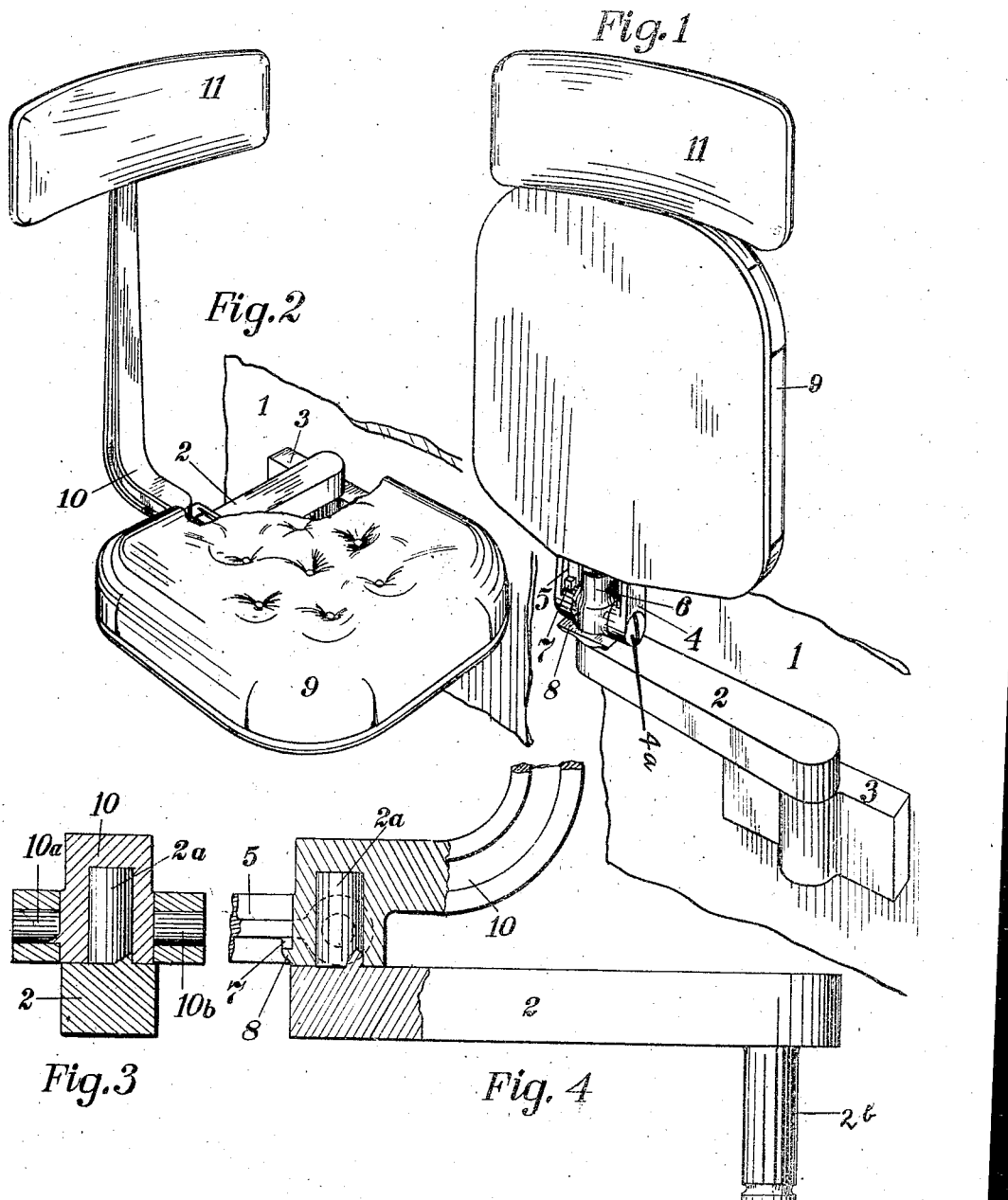
WITNESSES:
Charles F. Barndt
William J. Miller
INVENTORS.
BY
ATTORNEY.

UNITED STATES PATENT OFFICE.

CHARLES F. BARNDT AND WILLIAM J. MILLER, OF COLUMBUS, OHIO.

VEHICLE-SEAT.

No. 888,778.    Specification of Letters Patent.    Patented May 26, 1908.

Application filed April 24, 1907. Serial No. 369,893.

*To all whom it may concern:*

Be it known that we, CHARLES F. BARNDT and WILLIAM J. MILLER, citizens of the United States, residing at Columbus, in the county of Franklin and State of Ohio, have invented certain new and useful Improvements in Vehicle-Seats, of which the following is a specification.

Our invention relates to improvements in a vehicle seat, the seat portion being adapted to fold against the back, and the seat when thus folded being adapted to be swung against the side of the vehicle and out of the way. When thus folded, it occupies very little space and lies flatwise against the side of the vehicle, whence it may be easily unfolded and swung into position for use.

In the accompanying drawings, Figure 1 represents the seat in its most compactly folded form and swung into position against the side of the vehicle; Fig. 2 shows the seat portion folded downwardly, and then swung at a right angle with the position it occupies in Fig. 1; Fig. 3 is a vertical section through the pivot point of the seat upon the bracket, the seat portion being swung to the left to occupy a position at a right angle with that shown in Fig. 4; Fig. 4 is a view partly in section through the pivot point of the seat, the back and the supporting arm lying in the same vertical plane.

The improved seat herein shown and described is adapted especially for use in the tonneau of an automobile where it is frequently desired to provide a seat which may be folded into compact form to occupy slight space when not used, and which may be unfolded and swung into a convenient position when it is desired to use the same. In order to accomplish this end it is necessary to mount the seat at one side or at the front of the tonneau, so that when swung into position for use the seat may not be an obstruction to the occupants of the fixed or permanent seats therein. The side or wall portion of the tonneau upon which the seat is mounted is designated at 1, and is shown broken away on all sides, for the reason that it is not thought necessary to show the whole interior of the tonneau or vehicle. The bracket 3 is secured against the wall 1 and is provided with an opening therethrough for the reception of the pin $2^b$ upon the arm 2. The pin $2^b$ is placed in the opening in the bracket 3 from above, and the arm 2 when thus positioned may be swung in a horizontal plane. Adjacent the opposite end of the arm 2 and on the face opposite to that on which is placed the pin $2^b$, is a second pivot pin $2^a$ upon which the seat is positioned to rotate pivotally in a horizontal plane.

The standard 10 carrying at its upper end the back rest 11, is provided at its lower end with an opening to receive the pin $2^a$, upon which it is pivoted to rotate in a horizontal plane; the standard 10 is provided with the lateral pins $10^a$ and $10^b$, adapted to receive the seat frame pieces 4 and 5, the latter being of any desired size, determined by the size of the seat portion 9.

The seat frame pieces contain openings near their ends which openings receive the pin $10^a$ and $10^b$ upon the standard 10, and when thus positioned the seat may be swung upwardly and downwardly in a vertical plane, its lowermost position being shown in Fig. 2, its uppermost position being shown in Fig. 1.

Upon the arm 2, adjacent the pin $2^a$ is provided the enlargement 8, while upon the seat frame piece 5 is provided a lug 7, the latter adapted to contact with the extension 8 on arm 2 when the seat is in its lowermost position, thereby stopping the seat in a horizontal position and maintaining the same against weight placed thereon. The extent of the unfolding of the seat portion is therefore determined by the contact of the lug 7 with the extension 8, while the extent of the folding of the seat portion is determined by the contact of said seat portion with the standard 10.

6 designates the lower end of the standard 10 which is hollowed to receive the pin $2^a$ shown in Fig. 4.

When the parts are in the position shown in Fig. 1, the arm 2 bearing the seat portion thereon may be swung in a horizontal plane upon the bracket 3; when swung a sufficient distance away from the side wall 1, the folded seat portion and the back rest may be rotated in a horizontal plane about the pivot pin $2^a$, to any desired position. When the desired position is reached, the seat portion 9 may be folded downwardly until it assumes the position shown in Fig. 2, when it is ready for occupancy. The seat thus opened for use, may be rotated at the desire of the occupant in a horizontal plane about the pivot pin $2^a$, so that the occupant may assume any desired position with reference to the other occupants of the vehicle, and accordingly may face to face with them or sidewise or with the back towards them.

When the seat is no longer in use, the seat portion 9 may be folded upwardly to fit snugly against the standard 10 beneath the back rest 11, as appears in Fig. 1, and the supporting arm 2 may be swung laterally to bring the folded seat portion against the wall of the vehicle, out of the way of the occupants of the vehicle. When in this position the seat occupies very little space; if it is desired to remove the seat entirely, this may easily be done by lifting the pin $2^b$ out of the bracket 3.

The seat frame portions 4 and 5, after the same are positioned upon the pin $10^a$ and $10^b$, are adjustably secured in position by means of the screw $4^a$, which may be loosened or tightened as desired.

From the foregoing description it is apparent that we have provided a seat which is simple in its construction, which is readily attached to vehicles of any kind having occasion for the use of such seat, which is arranged so that the entire seat may be swung pivotally in a horizontal plane to bring the same into any position desired, which is further arranged so that the seat portion may be folded open or shut into compact position, and which also renders it possible for the seat to be rotated in a horizontal plane upon the supporting arm, at the same time that the whole construction is being swung pivotally. As pointed out above, our improved seat is adapted for use especially for automobiles, in which class of vehicle it is very often desired to provide an extra seat, which when not in use may be snugly positioned against the side of the vehicle.

Having thus described our invention, what we claim as new and desire to secure by Letters Patent is:

1. A folding seat construction comprising a bracket secured to a vehicle or the like, a supporting member having a downwardly projecting pin engaging with said bracket and a second pin at its opposite end projecting upwardly from said member, a member having a back rest at its upper end, and being hollowed at its lower end to receive said second pin, laterally projecting pins on said hollow end of said last mentioned member, a frame portion forming the seat proper hinged upon said last mentioned pins and adapted to be swung vertically, and a stop upon said frame adapted when said frame is in its horizontal position to engage a projection upon said supporting member whereby said seat frame is maintained in its proper horizontal position.

2. A seat comprising a supporting member having oppositely directed pins adjacent its opposite ends, a bracket to receive one of said pins, a standard having an opening therein to receive the other of said pins, laterally projecting pins upon said standard, seat frame members adapted to be positioned upon said laterally projecting pins to admit of a vertical hinge movement thereon, said seat thereby being rendered capable of a swinging movement in a horizontal plane, of a rotary movement in a horizontal plane, and of a folding movement in a vertical plane.

In testimony whereof we affix our signatures in the presence of two witnesses.

CHARLES F. BARNDT.
WILLIAM J. MILLER.

Witnesses:
GEO. W. RIGHTMIRE,
A. RAGER.